United States Patent
Kumar et al.

(10) Patent No.: US 9,926,086 B2
(45) Date of Patent: Mar. 27, 2018

(54) APPARATUS AND METHOD FOR WIRELESSLY MANAGING AIRCRAFT HEALTH DATA

(71) Applicant: THE BOEING COMPANY, Chicago, IL (US)

(72) Inventors: Anil Kumar, Sammamish, WA (US); Kesav R. Rayaprolu, Kirkland, WA (US); Alberto Ferrer, Bothell, WA (US); Kent A. Pflugrath, Seattle, WA (US)

(73) Assignee: The Boeing Company, Chicago, IL (US)

( * ) Notice: Subject to any disclaimer, the term of this patent is extended or adjusted under 35 U.S.C. 154(b) by 15 days.

(21) Appl. No.: 15/165,225

(22) Filed: May 26, 2016

(65) Prior Publication Data

US 2017/0341777 A1    Nov. 30, 2017

(51) Int. Cl.
| | | |
|---|---|---|
| G01M 17/00 | (2006.01) |
| B64F 5/60 | (2017.01) |
| G07C 5/00 | (2006.01) |
| G07C 5/08 | (2006.01) |
| H04W 24/04 | (2009.01) |
| H04W 24/08 | (2009.01) |
| H04W 72/10 | (2009.01) |
| H04Q 9/00 | (2006.01) |

(Continued)

(52) U.S. Cl.
CPC ............... B64F 5/60 (2017.01); G07C 5/008 (2013.01); G07C 5/085 (2013.01); H04Q 9/00 (2013.01); H04W 24/04 (2013.01); H04W 24/08 (2013.01); H04W 72/10 (2013.01); *H04W 84/12* (2013.01); *B64D 2045/0085* (2013.01); *H04Q 2209/40* (2013.01); *H04Q 2209/75* (2013.01); *H04Q 2209/82* (2013.01)

(58) Field of Classification Search
CPC ....... B64F 5/0045; G07C 5/008; G07C 5/085; H04W 24/04; H04W 24/08; H04W 72/10
USPC ................ 701/32.7; 702/188; 340/439, 506; 370/241
See application file for complete search history.

(56) References Cited

U.S. PATENT DOCUMENTS

| | | | |
|---|---|---|---|
| 6,009,356 A * | 12/1999 | Monroe | B64D 45/0015 340/439 |
| 6,246,320 B1 * | 6/2001 | Monroe | B64D 45/0015 340/506 |
| 8,787,904 B1 | 7/2014 | Hayes et al. | |

(Continued)

FOREIGN PATENT DOCUMENTS

| | | |
|---|---|---|
| EP | 1411485 | 4/2004 |
| WO | 2009121169 | 10/2009 |
| WO | 2013184894 | 12/2013 |

OTHER PUBLICATIONS

European Search Report, European Application No. 17170251.7, dated Oct. 17, 2017.

*Primary Examiner* — Shardul D Patel
(74) *Attorney, Agent, or Firm* — Perman & Green, LLP

(57) ABSTRACT

An apparatus for managing aircraft health data includes a wireless network server disposed onboard an aircraft, and at least one wireless condition monitoring device disposed onboard the aircraft, wirelessly connected to the wireless network server and configured to transmit respective health data to the wireless network server based on a communication scheme that maintains an availability of an aircraft wireless network.

20 Claims, 8 Drawing Sheets

(51) Int. Cl.
   *H04W 84/12*   (2009.01)
   *B64D 45/00*   (2006.01)

(56) References Cited

U.S. PATENT DOCUMENTS

| | | | |
|---|---|---|---|
| 8,963,691 | B1 | 2/2015 | Mitchell et al. |
| 9,576,404 | B2* | 2/2017 | Ziarno ................. H04B 1/3822 |
| 2006/0168090 | A1* | 7/2006 | Loda .................... H04L 67/025 |
| | | | 709/208 |
| 2008/0181169 | A1* | 7/2008 | Lauer ................. H04B 7/18506 |
| | | | 370/316 |
| 2009/0042557 | A1* | 2/2009 | Vardi .................... H04W 72/02 |
| | | | 455/422.1 |
| 2009/0248366 | A1* | 10/2009 | Scheid ..................... H04Q 9/00 |
| | | | 702/188 |
| 2009/0310571 | A1 | 12/2009 | Matischek et al. |
| 2009/0322551 | A1* | 12/2009 | Kanagala ................. G01S 1/68 |
| | | | 340/539.23 |
| 2011/0032826 | A1* | 2/2011 | Kim ...................... H04W 16/20 |
| | | | 370/241 |
| 2011/0195701 | A1 | 8/2011 | Cook et al. |
| 2013/0265173 | A1 | 10/2013 | Millar |
| 2014/0036686 | A1* | 2/2014 | Bommer ............... H04W 24/06 |
| | | | 370/241 |
| 2015/0067819 | A1* | 3/2015 | Shribman ............... H04L 67/06 |
| | | | 726/12 |
| 2016/0334786 | A1* | 11/2016 | Warpinski ............ G05D 1/0022 |
| 2017/0106995 | A1* | 4/2017 | Burte ................... B60T 17/221 |

\* cited by examiner

APPARATUS AND METHOD FOR WIRELESSLY MANAGING AIRCRAFT HEALTH DATA

BACKGROUND

Generally, aircraft have several components within, for example, the passenger cabin that are monitored for fault diagnosis. In conventional fault diagnosis systems, each of the monitored aircraft cabin components are connected to a data collection unit, such as a centralized data recorder, using wires. The wires connecting each monitored aircraft cabin component to the centralized data recorder adds weight to the aircraft and decreases the efficiency of the aircraft. Additionally, the wires connecting each monitored aircraft cabin component to the centralized data recorder occupy valuable cabin space, thereby decreasing the amount of space available to passengers and crew of the aircraft.

SUMMARY

Accordingly, apparatuses and methods, intended to address at least the above-identified concerns, would find utility.

The following is a non-exhaustive list of examples, which may or may not be claimed, of the subject matter according to the present disclosure.

One example of the subject matter according to the present disclosure relates to an apparatus for managing aircraft health data. The apparatus comprises a wireless network server disposed onboard an aircraft; and at least one wireless condition monitoring device disposed onboard the aircraft, wirelessly connected to the wireless network server and configured to transmit respective health data to the wireless network server based on a communication scheme that maintains an availability of an aircraft wireless network.

Another example of the subject matter according to the present disclosure relates to a method for managing aircraft health data. The method comprises configuring communication between a wireless network server disposed onboard an aircraft and at least one wireless condition monitoring device disposed onboard the aircraft; and wirelessly transmitting respective health data from the at least one wireless condition monitoring device to the network server based on a communication scheme that maintains an availability of an aircraft wireless network.

Still another example of the subject matter according to the present disclosure relates to an aircraft. The aircraft comprises a cabin; at least one end device disposed onboard the aircraft; and an aircraft health data monitoring system. The aircraft health data monitoring system includes a wireless network server disposed onboard the aircraft; and at least one wireless condition monitoring device associated with a respective one of the at least one end device and disposed onboard the aircraft, the at least one wireless condition monitoring device being wirelessly connected to the wireless network server and configured to transmit respective health data, corresponding to respective one of the at least one end device, to the network server based on a communication scheme that maintains an availability of an aircraft wireless network.

BRIEF DESCRIPTION OF THE DRAWINGS

Figure 1A:
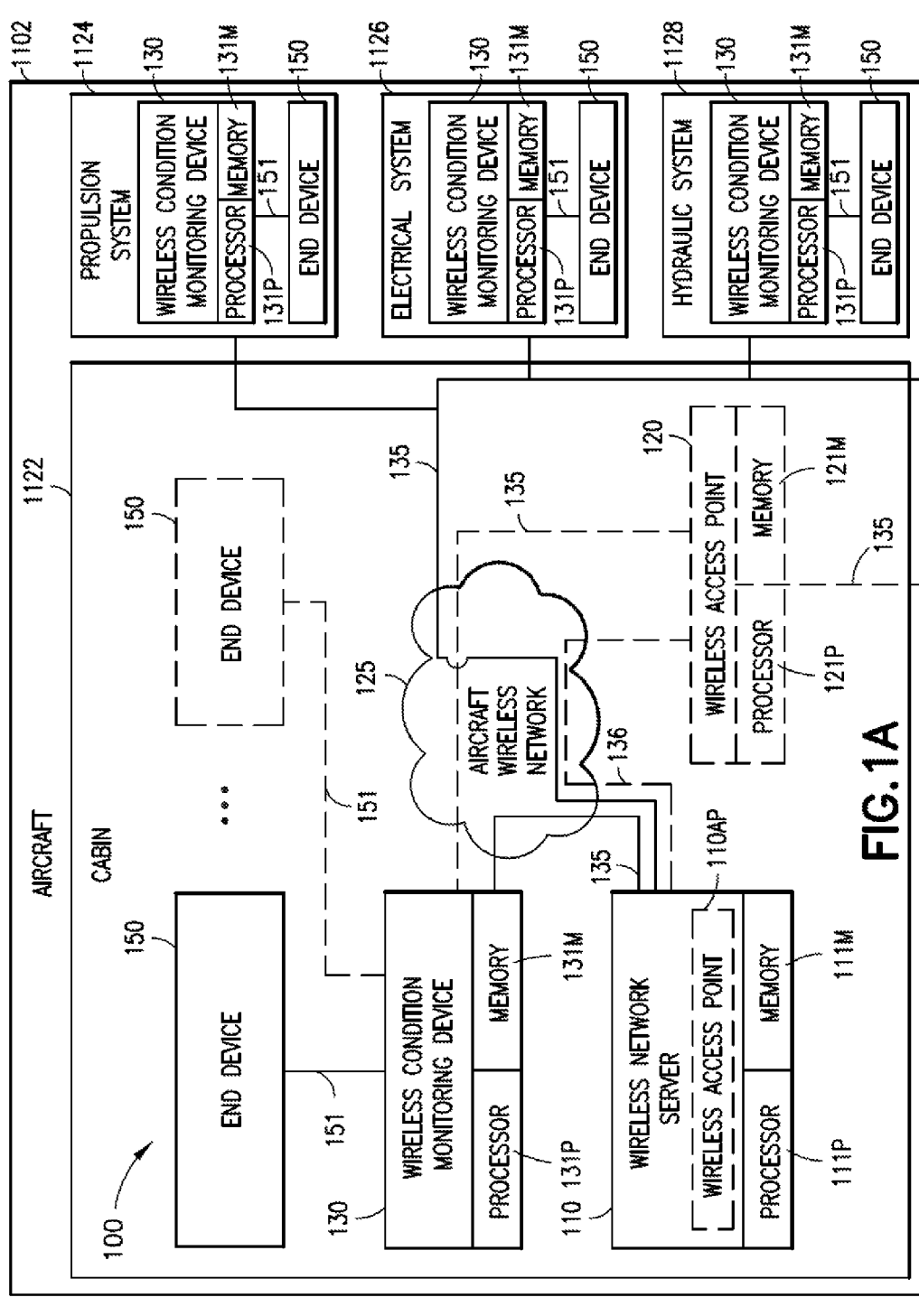
Figure 1B:
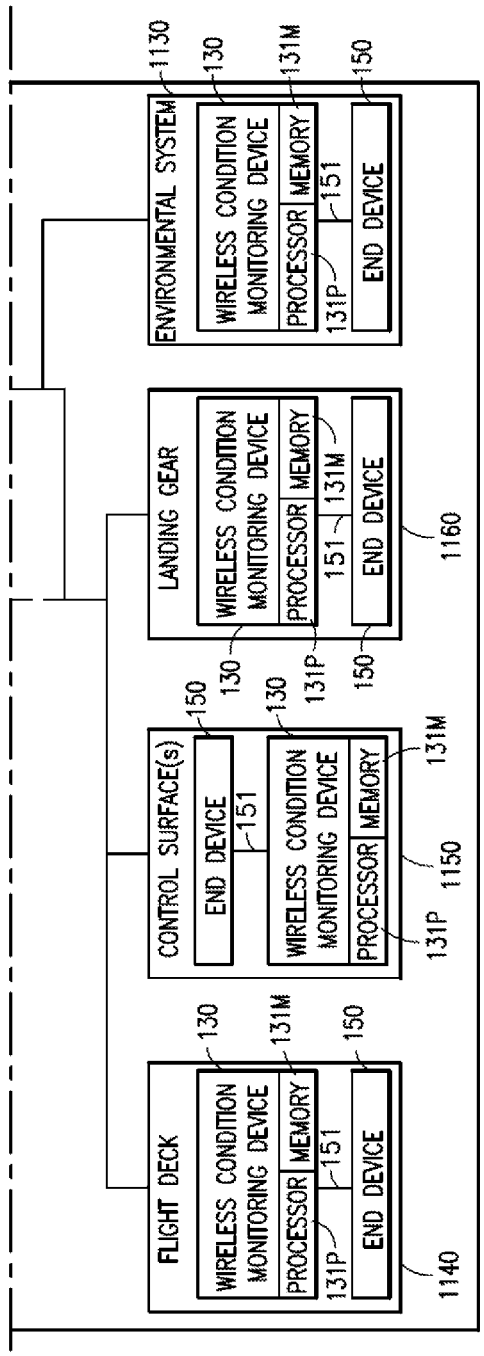
Figure 1B:
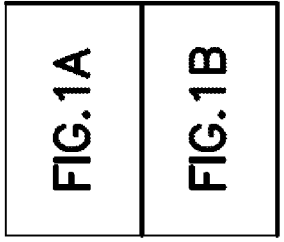
Figure 2:
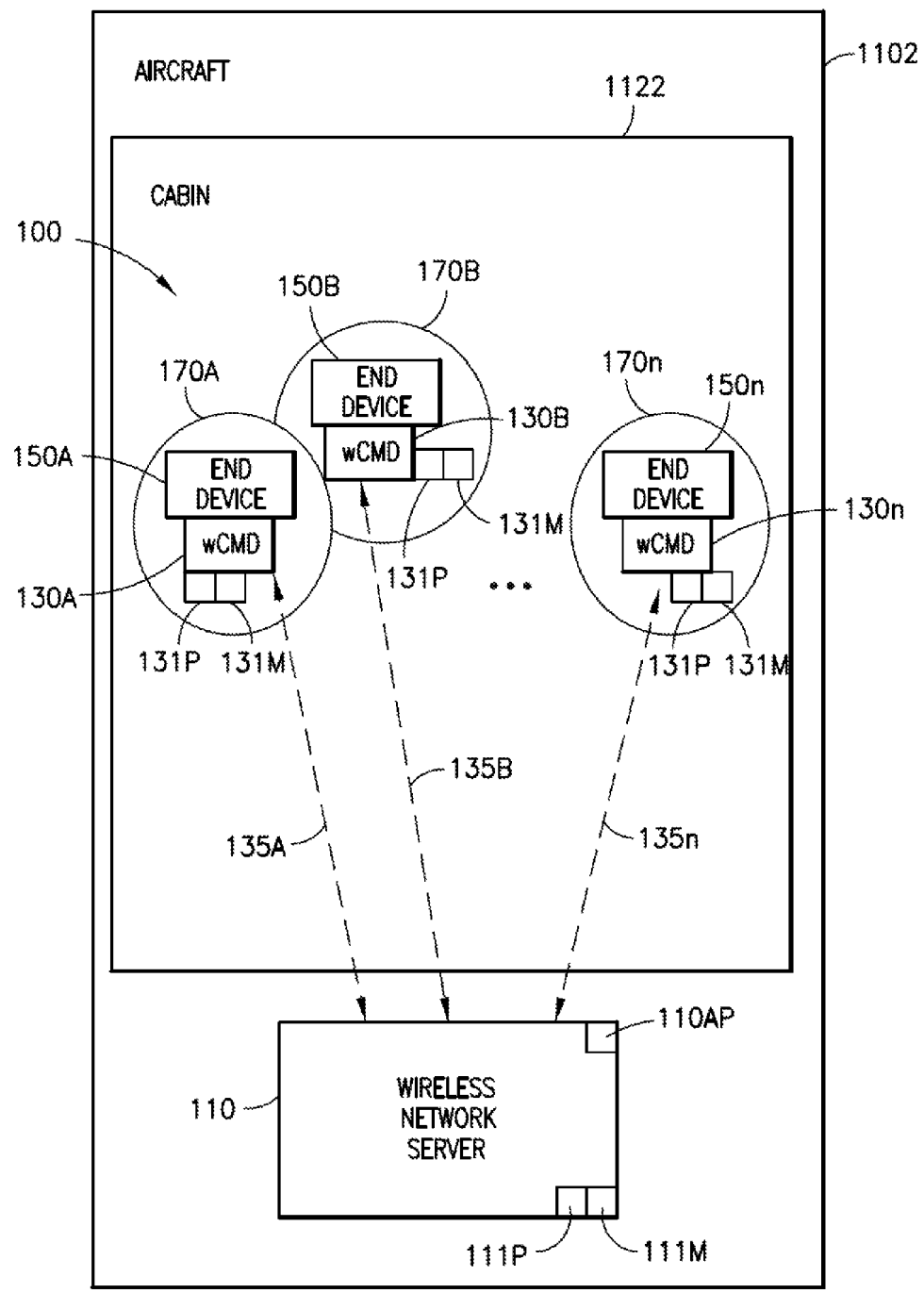
Figure 3:
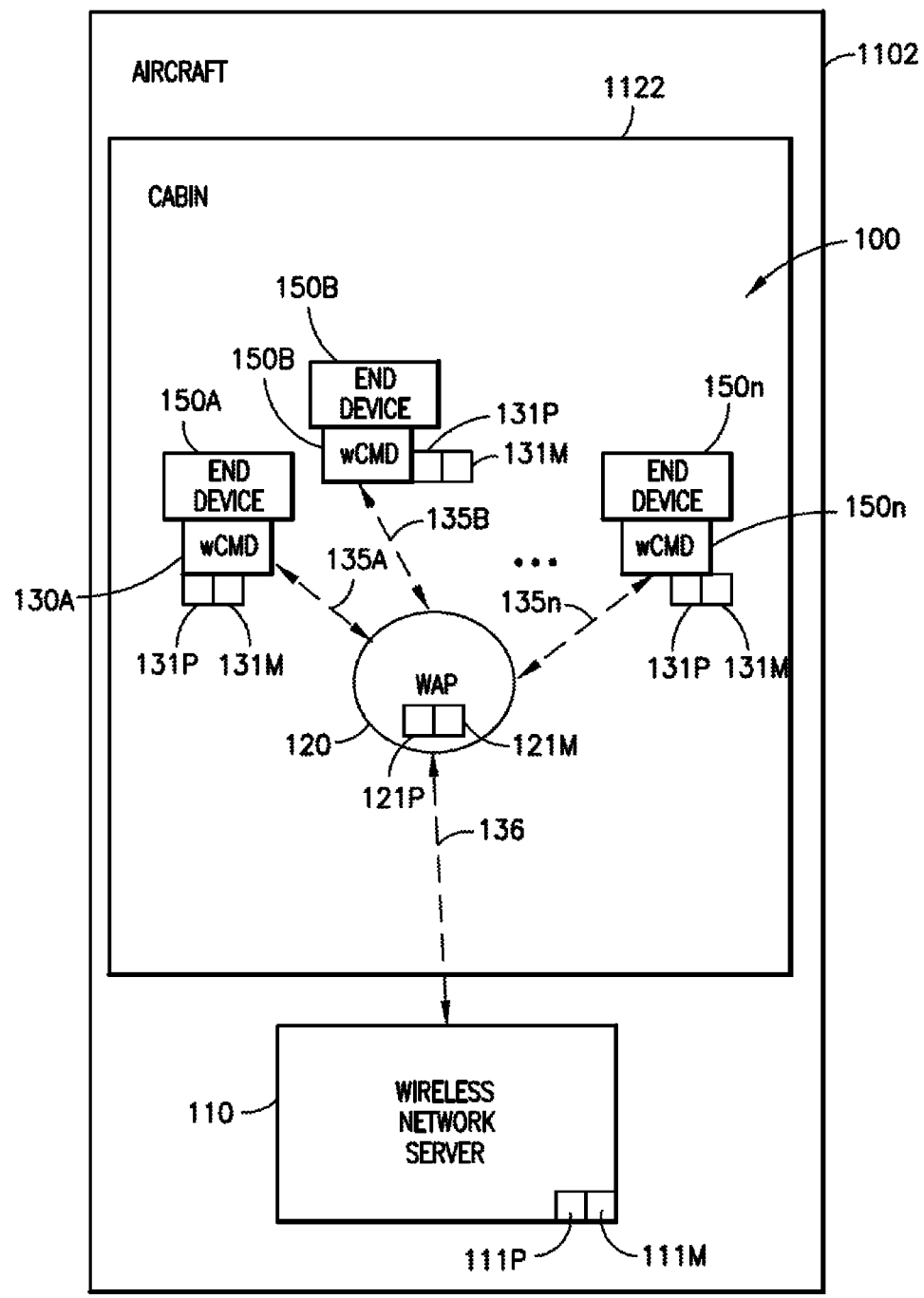
Figure 4:
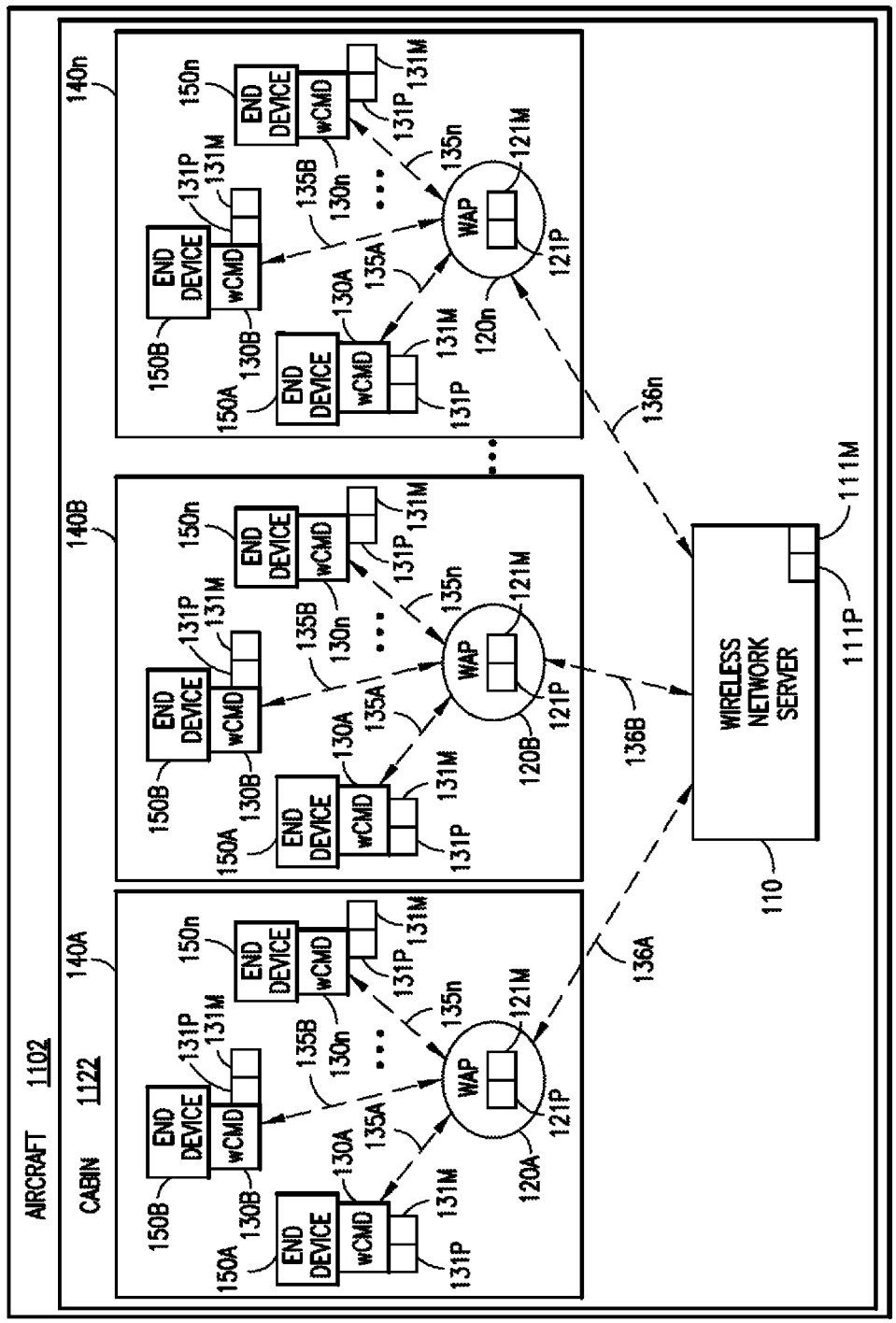
Figure 5:
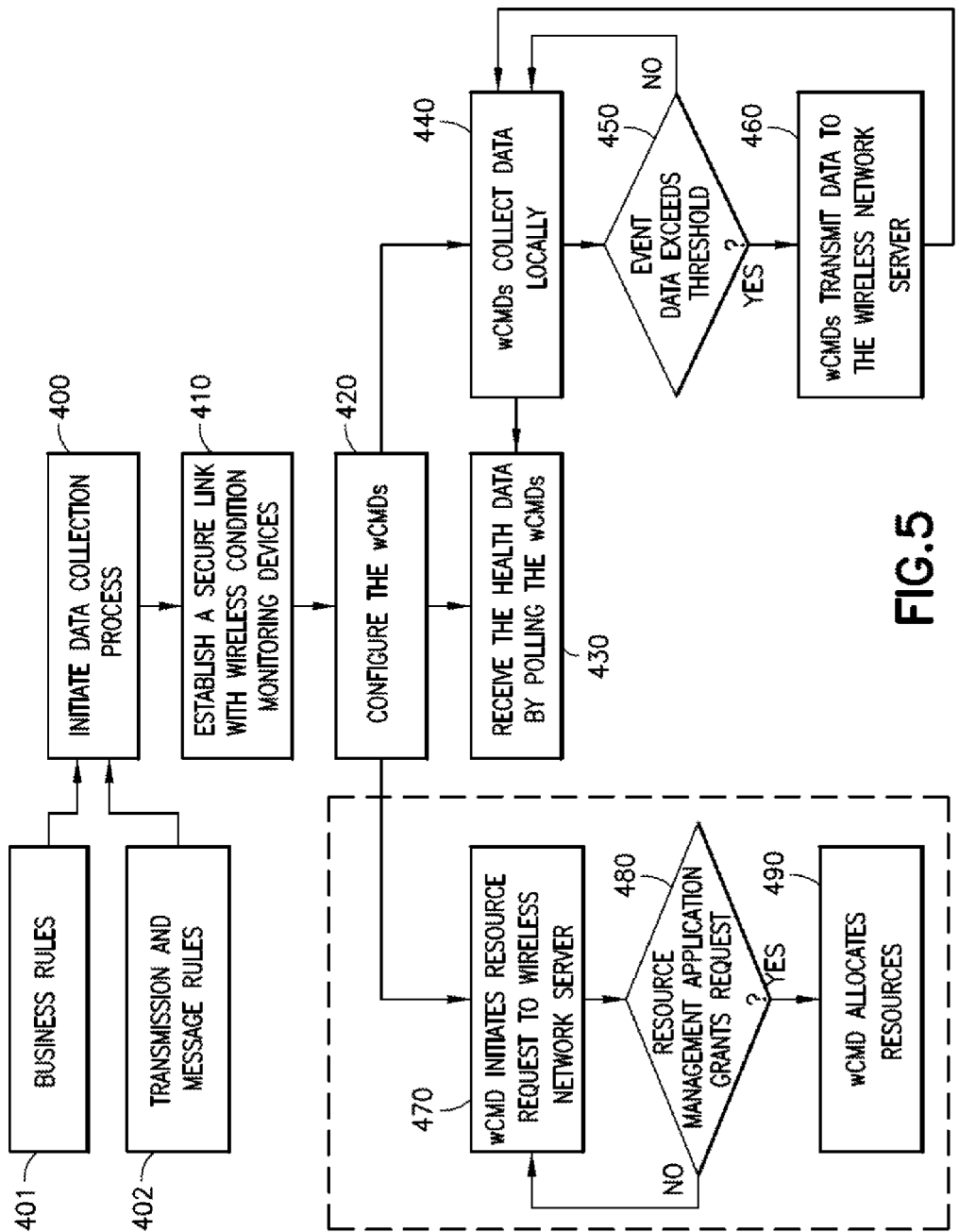
Figure 6:
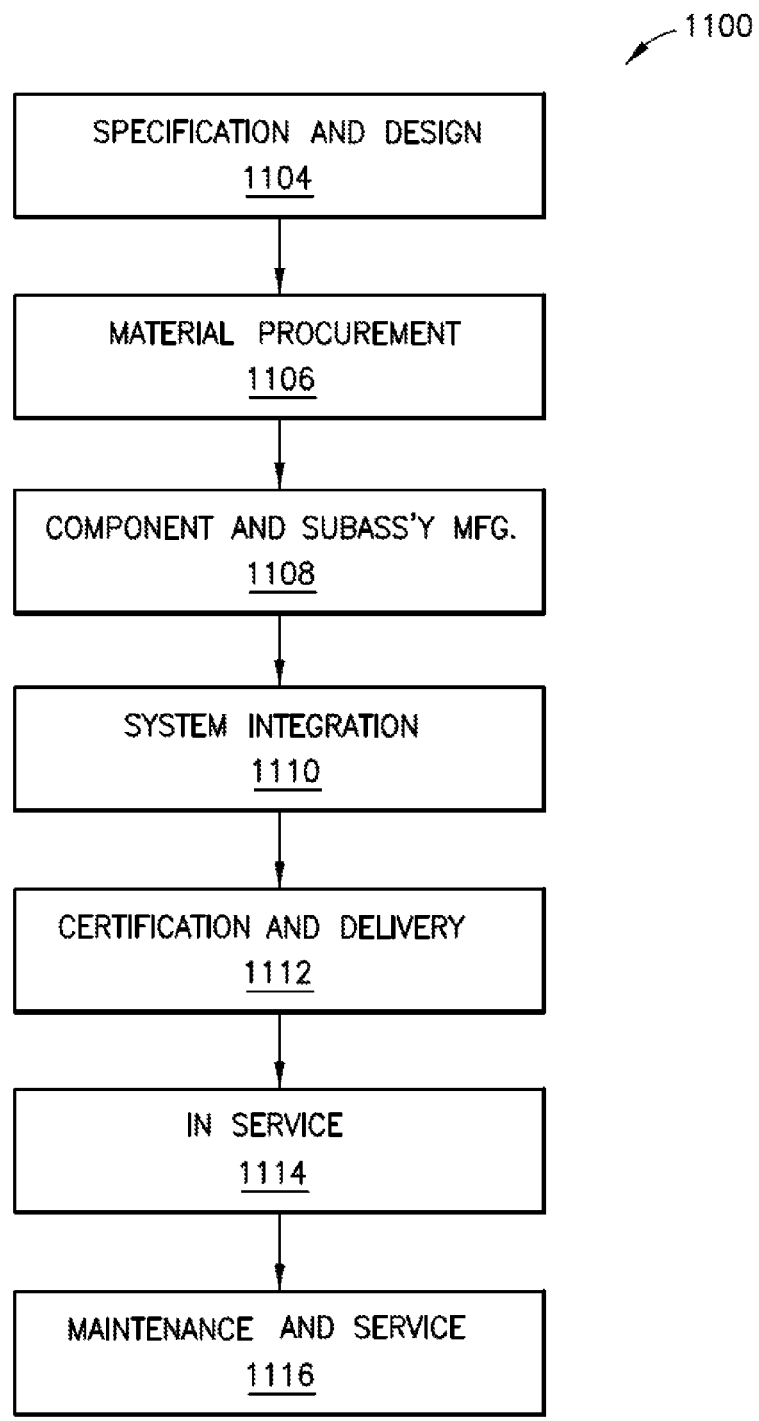

Having thus described examples of the present disclosure in general terms, reference will now be made to the accompanying drawings, which are not necessarily drawn to scale, and wherein like reference characters designate the same or similar parts throughout the several views, and wherein:

FIG. 1 (which is comprised of FIG. 1A and FIG. 1B) is a block diagram of an apparatus for managing aircraft health data, according to one or more aspects of the present disclosure;

FIG. 2 is a schematic illustration of an apparatus for managing aircraft health data, according to one or more aspects of the present disclosure;

FIG. 3 is a schematic illustration of an apparatus for managing aircraft health data, according to one or more aspects of the present disclosure;

FIG. 4 is a schematic illustration of an apparatus for managing aircraft health data, according to one or more aspects of the present disclosure;

FIG. 5 is a flow diagram of a method, according to one or more aspects of the present disclosure;

FIG. 6 is a block diagram of aircraft production and service methodology; and

Figure 7:
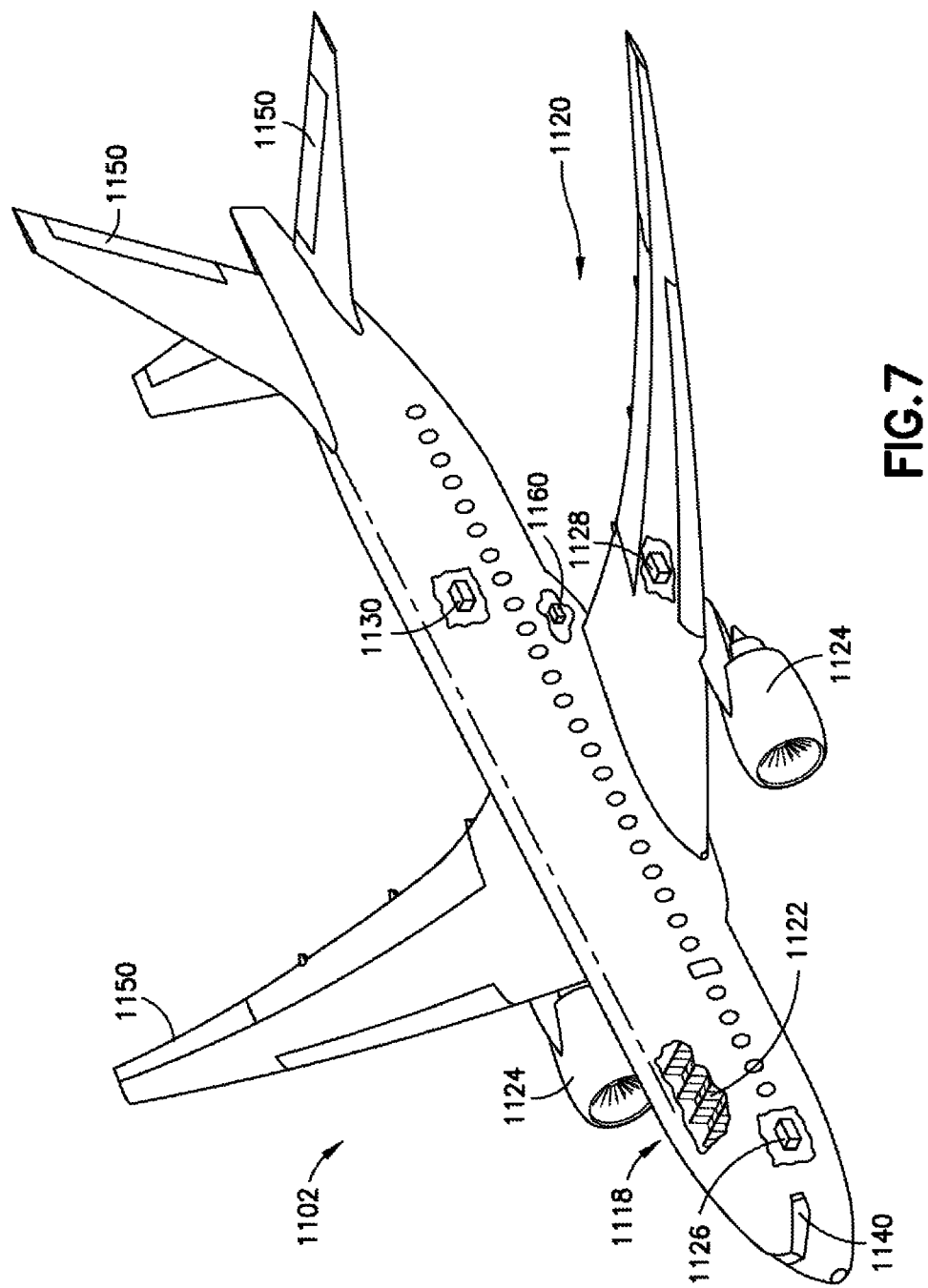

FIG. 7 is a schematic illustration of an aircraft.

DETAILED DESCRIPTION

In FIG. 1, referred to above, solid lines, if any, connecting various elements and/or components may represent mechanical, electrical, fluid, optical, electromagnetic, wireless and other couplings and/or combinations thereof. As used herein, "coupled" means associated directly as well as indirectly. For example, a member A may be directly associated with a member B, or may be indirectly associated therewith, e.g., via another member C. It will be understood that not all relationships among the various disclosed elements are necessarily represented. Accordingly, couplings other than those depicted in the block diagrams may also exist. Dashed lines, if any, connecting blocks designating the various elements and/or components represent couplings similar in function and purpose to those represented by solid lines; however, couplings represented by the dashed lines may either be selectively provided or may relate to alternative examples of the present disclosure. Likewise, elements and/or components, if any, represented with dashed lines, indicate alternative examples of the present disclosure. One or more elements shown in solid and/or dashed lines may be omitted from a particular example without departing from the scope of the present disclosure. Environmental elements, if any, are represented with dotted lines. Virtual (imaginary) elements may also be shown for clarity. Those skilled in the art will appreciate that some of the features illustrated in FIG. 1, may be combined in various ways without the need to include other features described in FIG. 1, other drawing figures, and/or the accompanying disclosure, even though such combination or combinations are not explicitly illustrated herein. Similarly, additional features not limited to the examples presented, may be combined with some or all of the features shown and described herein.

In FIGS. 5 and 6, referred to above, the blocks may represent operations and/or portions thereof and lines connecting the various blocks do not imply any particular order or dependency of the operations or portions thereof. Blocks represented by dashed lines indicate alternative operations and/or portions thereof. Dashed lines, if any, connecting the various blocks represent alternative dependencies of the operations or portions thereof. It will be understood that not all dependencies among the various disclosed operations are necessarily represented. FIGS. 5 and 6 and the accompanying disclosure describing the operations of the method(s) set forth herein should not be interpreted as necessarily determining a sequence in which the operations are to be performed. Rather, although one illustrative order is indicated, it is to be understood that the sequence of the operations may be modified when appropriate. Accordingly, certain operations may be performed in a different order or simultaneously. Additionally, those skilled in the art will appreciate that not all operations described need be performed.

In the following description, numerous specific details are set forth to provide a thorough understanding of the disclosed concepts, which may be practiced without some or all of these particulars. In other instances, details of known devices and/or processes have been omitted to avoid unnecessarily obscuring the disclosure. While some concepts will be described in conjunction with specific examples, it will be understood that these examples are not intended to be limiting.

Unless otherwise indicated, the terms "first," "second," etc. are used herein merely as labels, and are not intended to impose ordinal, positional, or hierarchical requirements on the items to which these terms refer. Moreover, reference to, e.g., a "second" item does not require or preclude the existence of, e.g., a "first" or lower-numbered item, and/or, e.g., a "third" or higher-numbered item.

Reference herein to "one example" means that one or more feature, structure, or characteristic described in connection with the example is included in at least one implementation. The phrase "one example" in various places in the specification may or may not be referring to the same example.

As used herein, a system, apparatus, structure, article, element, component, or hardware "configured to" perform a specified function is indeed capable of performing the specified function without any alteration, rather than merely having potential to perform the specified function after further modification. In other words, the system, apparatus, structure, article, element, component, or hardware "configured to" perform a specified function is specifically selected, created, implemented, utilized, programmed, and/or designed for the purpose of performing the specified function. As used herein, "configured to" denotes existing characteristics of a system, apparatus, structure, article, element, component, or hardware which enable the system, apparatus, structure, article, element, component, or hardware to perform the specified function without further modification. For purposes of this disclosure, a system, apparatus, structure, article, element, component, or hardware described as being "configured to" perform a particular function may additionally or alternatively be described as being "adapted to" and/or as being "operative to" perform that function.

Illustrative, non-exhaustive examples, which may or may not be claimed, of the subject matter according the present disclosure are provided below.

Referring to FIG. 1 an apparatus for managing aircraft health data 100 (referred to herein as the "apparatus 100") is illustrated. The apparatus 100 provides for wireless monitoring of aircraft equipment where data collected from the aircraft equipment is used for health management of the aircraft equipment to support fault diagnostics and prognostics. In one aspect, the aircraft equipment is aircraft cabin equipment while in other aspects, the aircraft equipment is flight deck 1140 equipment, aircraft control surfaces 1150, aircraft landing gear 1160 and/or any other equipment onboard the aircraft that may be part of the aircraft propulsion system 1124, electrical system 1126, hydraulic system 1128 and/or environmental system 1130. As will be described in greater detail herein, the apparatus 100 utilizes an aircraft wireless network 125, such as an aircraft cabin wireless network, already onboard the aircraft which reduces wiring effort for the apparatus 100, reduces the weight of the aircraft and reduces the cost of the aircraft (e.g. due to a decreased use of wires). The data management of the apparatus 100 over the aircraft wireless network 125 is efficient and reduces network congestion and power consumed by wireless condition monitoring devices 130 of the apparatus 100 and/or end devices 150 to which the wireless condition monitoring devices 130 are coupled to or are a part of. As described herein, in one aspect, the apparatus 100 is configured to divide the data obtained from the end devices 150 into both event driven and polled messages for an efficient use of existing wireless spectrum resources on the aircraft (e.g. a mobile platform) and reduces contention to the wireless spectrum resources. In addition, the limited transmissions made by the apparatus 100, e.g. due to at least the event driven and polled message scheme, the power sources of the wireless condition monitoring devices 130 may be made smaller which reduces the size of the wireless condition monitoring devices 130 so that the wireless condition monitoring devices 130 fit into an existing envelope of (e.g. the allotted space for) the end device 150 being monitored. Further, because the apparatus 100 uses the existing aircraft wireless network 125, the apparatus 100 may be installed in any newly manufactured aircraft as well as retrofit into any existing aircraft including but not limited to variants of the Boeing 777. In the event the aircraft does not have an aircraft wireless network one may be installed in the aircraft in conjunction with installing the apparatus 100. The apparatus 100 may prevent the end devices 150, of the aircraft, being monitored from entering a fault mode during flights, as the data collected from the end devices 150 by the apparatus 100 may detect possible faults prior to the occurrence of the fault so that the end device 150 may be repaired or replaced prior to any (subsequent) flight of the aircraft.

The apparatus 100 includes a wireless network server 110 disposed onboard an aircraft 1102 and at least one wireless condition monitoring device 130 (also referred to herein as "wCMD") disposed within at least a cabin 1122 of the aircraft 1102. In other aspects, the at least one wireless condition monitoring device 130 may be located outside the cabin 1122, such as on the flight deck 1140 of the aircraft 1102, in the fuselage adjacent an outer surface (e.g. control surface 1150) of the aircraft 1102, on the landing gear 1160 of the aircraft 1102 or at any other location of the aircraft 1102. The at least one wireless condition monitoring device 130 is wirelessly connected to the wireless network server 110 and is configured to transmit respective health data to the wireless network server 110 based on a communication scheme that maintains an availability of the aircraft wireless network 125, where the aircraft wireless network 125 is an aircraft information network not available for passenger/public use. The wireless network server 110 may be an airplane information server or part of a controller onboard an aircraft 1102. In one aspect, the wireless network server 110 is located within the interior or cabin 1122 of the aircraft 1102 while in other aspects, the wireless network server 110 may be located at any suitable location onboard the aircraft 1102. The wireless network server 110 includes a processor 111P and a memory 111M that are configured with, e.g., suitable programming to execute the aspects of the present disclosure described herein. The wireless network server 110 communicates with the at least one wireless condition monitoring device 130 in any suitable manner such as through a direct connection or an indirect connection and using any suitable wireless communication protocol. For example, in one aspect, the wireless network server 110 communicates substantially directly with at least one wireless condition monitoring device over a wireless connection 135; while in other aspects, the connection between the wireless network server 110 and the at least one wireless condition monitoring device 130 is an indirect connection through one or more wireless access points 120. Each wireless access point 120 includes a processor 121P and a memory 121M that are configured with, e.g., suitable programming to execute the aspects of the present disclosure described herein. The wireless access point 120 communicates with respective wireless condition monitoring devices 130 through, for example, wireless connection 135 using any suitable wireless communication protocol and communicates with the wireless network server through connection 136, where the connection 136 is, in one aspect, a wireless connection using any suitable wireless communication protocol and in other aspects the connection 136 is a wired connection.

Each wireless condition monitoring device 130 includes a processor 131P and a memory 131M that are configured with, e.g., suitable programming to execute the aspects of the present disclosure described herein. In one aspect, each wireless condition monitoring device 130 is coupled to one or more end devices 150 by connection 151 in any suitable manner, where the connection 151 is a wireless or a wired connection. In another aspect, a wireless condition monitoring device 130 may be integrated within the device being monitored. One or more end devices 150 may be any suitable device(s) within the cabin 1122 of the aircraft 1102 including, but not limited to, for example, aircraft passenger seating monitoring device for monitoring actuation system(s) of one or more respective seats, passenger seat actuator(s), aircraft lavatory equipment monitoring device(s) for monitoring operation of lavatory equipment, lavatory equipment (fluid pumps, lighting, ventilation fans, etc.), cabin lighting, aircraft service galley equipment monitoring device(s) for monitoring one or more devices of a respective galley, service galley equipment (e.g. microwaves, refrigerators, lighting, etc.), cabin information displays (e.g. no smoking displays, exit sign displays, fasten seatbelt displays, etc.), aircraft cabin video and audio monitoring device(s) for monitoring operation of one or more aircraft passenger entertainment devices, aircraft video entertainment displays (such as seat back mounted or cabin mounted video displays), aircraft audio entertainment equipment and aircraft power outlets (e.g. USB or alternating current power outlets). In other aspects, the end devices 150 may be any suitable devices exterior to the cabin 1122 of the aircraft 1102 such as flight control equipment on the flight deck 1140, actuators for control surfaces 1150 of the aircraft 1102, actuators of the landing gear 1160 of the aircraft 1102 or any other suitable components of the propulsion, electrical, hydraulic and/or environmental systems 1124, 1126, 1128, 1130 of the aircraft 1102.

Referring to FIGS. 2-4, in one aspect, the wireless condition monitoring devices 130A-130n will be described with respect to the aircraft cabin 1122 however wireless network configurations that have configurations corresponding to those described herein for the aircraft cabin 1122 are applied when the apparatus 100 includes wireless condition monitoring devices for monitoring end devices 150 (such as those described above) located outside the cabin 1122. Referring to FIG. 2, the apparatus 100 includes any suitable number of wireless condition monitoring devices 130A-130n disposed within the cabin 1122 where each wireless condition monitoring device 130A-130n is coupled to a respective end device 150A-150n that is also disposed within the cabin 1122, again noting that in other aspects, the end devices and wireless condition monitoring devices may also be located outside the cabin 1122. In other aspects, at least one wireless condition monitoring device 130A-130n may be coupled to more than one end device 150A-150n for collecting data from the more than one end device 150A-150n. In this aspect, each wireless condition monitoring device 130A-130n is substantially directly wirelessly connected to the wireless network server 110. Also in this aspect, the wireless network server 110 integrally includes the wireless access point 110AP for wirelessly communicating with the wireless condition monitoring devices 130A-130n although in other aspects, similar to that described below, a separate wireless access point may be used. In one aspect, the wireless network server 110 manages each of the wireless condition monitoring devices 130A-130n in terms of configuration control, security, business logic and prioritization of messages being transmitted over the aircraft wireless network 125 as described herein.

Referring to FIG. 3, in one aspect, the apparatus 100 includes any suitable number of wireless condition monitoring devices 130A-130n disposed within the cabin 1122 where each wireless condition monitoring device 130A-130n is coupled to a respective end device 150A-150n that is also disposed within the cabin 1122, again noting that in other aspects, the end devices and wireless condition monitoring devices may also be located outside the cabin 1122. In other aspects, at least one wireless condition monitoring device 130A-130n may be coupled to more than one end device 150A-150n for collecting data from the more than one end device 150A-150n. In this aspect, each wireless condition monitoring device 130A-130n is wirelessly connected to wireless access point 120. The wireless access point 120 is, in one aspect, also disposed within the cabin 1122 while in other aspects, the wireless access point 120 may be disposed at any suitable location onboard the aircraft 1102. In this aspect, the wireless access point 120 is connected to the wireless network server 110 over wireless connection 136 while in other aspects, the connection between the wireless access point 120 and the wireless network server may be a wired connection. In one aspect, the wireless network server 110 manages each of the wireless condition monitoring devices 130A-130n as well as the wireless access point 120 in terms of configuration control, security, business logic and prioritization of messages being transmitted over the aircraft wireless network 125 as described herein.

Referring to FIG. 4, in one aspect, the wireless condition monitoring devices 130A-130n are divided into equipment groups 140A-140n. Each equipment group 140A-140n includes a respective wireless access point 120A-120n and a respective one or more wireless condition monitoring device 130A-130n. Each of the wireless condition monitoring devices 130A-130n for a respective group 140A-140n is in wireless communication with the wireless access point 120A-120n for that group 140A-140n in the manner described above. Each of the wireless access points 120A-120n is wirelessly connected (or in other aspects connected by wire) to the wireless network server 110 in the manner described above. In one aspect, the wireless network server 110 manages the components of each of the equipment groups 140A-140n in terms of configuration control, security, business logic and prioritization of messages being transmitted over the aircraft wireless network 125 as described herein.

Referring to FIG. 2, in one aspect, where more than one wireless condition monitoring devices 130, 130A-130n are provided, each of the wireless condition monitoring devices 130, 130A-130n may act as an independent node 170 of the apparatus 100. In other aspects, the wireless condition monitoring devices 130, 130A-130n may be configured to communication with other wireless condition monitoring devices 130, 130A-130n in a group of wireless condition monitoring devices 130, 130A-130n, where one of the wireless condition monitoring device 130, 130A-130n acts as a master for at least another wireless condition monitoring device 130, 130A-130n within the group (e.g., in a single group as illustrated in FIGS. 2 and 3 and/or in multiple equipment groups 140A-140n as illustrated in FIG. 4). In one aspect, the master wireless condition monitoring device 130, 130A-130n may collect health data from the other wireless condition monitoring devices 130, 130A-130n in the group and transmit the collected health data to the wireless network server 110. In other aspects, the master wireless condition monitoring device 130, 130A-130n may instruct the other wireless condition monitoring devices 130, 130A-130n when to collect health data and/or when to transmit health data to the wireless network server 110 (e.g. such as during a predetermined flight phase or when the aircraft wireless network 125 is substantially free from interference).

In one aspect, the wireless communication between the wireless condition monitoring devices 130, 130A-130n and the wireless network server 110 within the aircraft wireless network 125 is performed over a secure wireless connection. Likewise, when the wireless access point 120, 120A-120n is provided the wireless communication between the wireless condition monitoring devices 130, 130A-130n and the wireless access point 120, 120A-120n and between the wireless access point 120, 120A-120n and the wireless network server 110 is performed over a secure wireless connection. The secure connections between the wireless conditioning monitoring devices 130, 130A-130n and the wireless network server 110 may be established in any suitable manner including registration of a MAC address and/or a unique identifier of each of the wireless conditioning monitoring devices 130, 130A-130n with the wireless network server 110, that is stored as persistent configuration data of the aircraft. In one aspect, the unique identifier may be a respective serial number of the wireless conditioning monitoring device 130, 130A-130n or any other suitable unique identifier including any suitable characters such as alphanumeric characters. The secure connections between the wireless conditioning monitoring devices 130, 130A-130n and the respective wireless access point 120, 120A-120n may be established in any suitable manner including registration of a MAC address and/or unique identifier of the at least one wireless conditioning monitoring device 130, 130A-130n with a respective wireless access point 120, 120A-120n. Similarly, the secure connections between the wireless access point 120, 120A-120n and the wireless network server 110 may be established in any suitable manner including registration of a MAC address and/or unique identifier of the wireless access point 120, 120A-120n with the wireless network server 110. In one aspect, the wireless network server 110 may include a registry of the MAC addresses and/or unique identifier(s) of the wireless condition monitoring device(s) 130, 130A-130n. In another aspect, where one or more wireless access points 120, 120A-120n are used, the wireless network server 110 may include a registry of the MAC addresses and/or unique identifiers of both the wireless condition monitoring device(s) 130, 130A-130n and the wireless access point(s) 120, 120A-120n and/or a registry correlating the wireless condition monitoring device(s) 130, 130A-130n with the respective wireless access point(s) 120, 120A-120n. In one aspect, the wireless condition monitoring devices 130, 130A-130n and the wireless access points 120, 120A-120n are configured to send a respective MAC address and/or unique identifier to the wireless network server upon initialization of the apparatus 110 only if the respective wireless condition monitoring device 130, 130A-130n or the respective wireless access point 120, 120A-120n is not already registered with the wireless network server 110 however, in other aspects the MAC addresses and/or unique identifiers may be sent at any suitable times. Sending a MAC address and/or unique identifier only when the associated device (e.g. wireless condition monitoring device or wireless access point) is not already registered with the wireless network server 110 reduces apparatus 110 network traffic within the aircraft wireless network 125 providing for a more secure wireless link to be established. In one aspect, the MAC addresses and/or unique identifiers of the wireless condition monitoring devices 130, 130A-130n and/or in the wireless access points 120, 120A-120n are checked with the persistent configuration data of the aircraft, where the persistent configuration data is stored a priori to authenticate the wireless condition monitoring devices 130, 130A-130n and/or in the wireless access points 120, 120A-120n. In other aspects, authentication for the wireless condition monitoring devices 130, 130A-130n and/or in the wireless access points 120, 120A-120n may be provided in any suitable manner. For example, access to joining the aircraft wireless network 125 for communicating with the wireless network server 110 is restricted to authorized wireless condition monitoring devices 130, 130A-130n utilizing the secured network connectivity described above so that rogue devices are not allowed on the aircraft wireless network 125 (i.e. the wireless network server 110 is configured to reject any unauthorized device attempting to access the aircraft wireless network 125). Devices from other aircraft parked alongside aircraft 1102, such as at an airport gate, are also prevented from accessing the aircraft wireless network 125, the wireless network server 110, the wireless condition monitoring devices 130, 130A-130n and/or the wireless access points 120, 120A-120n by the secured network connectivity described above. In other aspects, the broadcast power of the wireless network server 110, the wireless condition monitoring devices 130, 130A-130n and/or the wireless access points 120, 120A-120n may be limited so that communications sent from the wireless network server 110, the wireless condition monitoring devices 130, 130A-130n and/or the wireless access points 120, 120A-120n will not travel outside the aircraft 1102.

As noted above, communication between the wireless condition monitoring devices 130, 130A-130n and the network server 110 is performed in accordance with a predetermined communication scheme. In one aspect, the predetermined communication scheme is a prioritized communication scheme where communications are prioritized based on event prioritization where an event requiring higher precedence will be transmitted before events having a lower priority. In one aspect, the prioritized communication includes one or more of spatial logic (e.g. spatial locations of the devices) and temporal logic. In one aspect, spatial and temporal logic are mixed in the communication scheme to increase security of the network by increasing the complexity of communication timing (e.g. a regular communication pattern may not be readily discernable) within the communication scheme. In one aspect, the at least one wireless condition monitoring device 130, 130A-130n is configured to transmit health data to the wireless network server 110 based on an occurrence of a predetermined event, such as aircraft take-off, aircraft landing, in-flight, etc. In one aspect, end devices 150, 150A-150n may be categorized in an order of highest priority devices to lowest priority devices such that when communication prioritization is event driven, the wireless condition monitoring devices 130, 130A-130n coupled to the higher priority end devices 150, 150A-150n communicate data over the aircraft wireless network 125 before wireless condition monitoring devices 130, 130A-130n coupled to the lower priority end devices 150, 150A-150n.

In one aspect, the wireless network server 110 is configured to poll at least one wireless condition monitoring device 130, 130A-130n at predetermined time intervals for the transmission of health data from the at least one wireless condition monitoring device 130, 130A-130n. In one aspect, the wireless network server 110 is configured for both polling and event-driven messaging with the at least one wireless condition monitoring device 130, 130A-130n. The polling rates of the wireless network server 110 may be controlled so that the wireless condition monitoring devices 130, 130A-130n coupled to the higher priority end devices 150, 150A-150n are polled more frequently than the wireless condition monitoring devices 130, 130A-130n coupled to the lower priority end devices 150, 150A-150n.

In one aspect, at least one wireless condition monitoring device 130, 130A-130n is configured to prioritize health data collected by the at least one wireless condition monitoring device 130, 130A-130n prior to transmission of the health data to the wireless network server 110 where urgent health data messages are transferred at any suitable time and lower priority health data messages are transmitted when polled by the wireless network server 110 depending on, for example, the context (e.g. take-off, in-flight or landing phases of flight) of the health data. In one aspect, each wireless condition monitoring device 130, 130A-130n is configured to prioritize health data collected by that wireless condition monitoring device 130, 130A-130n in any suitable manner, such as according to a time the data was collected, an event/context associated with the data or based upon any other suitable criteria.

In one aspect, the apparatus 100 employs context (e.g. take-off, in-flight or landing phases of flight) aware data management that uses predefined rules to perform data logging. In one aspect, the at least one wireless condition monitoring device 130, 130A-130n is configured to record predetermined health data based on rules assigned to a corresponding flight for the aircraft, where the predetermined health data is transmitted to and stored by the wireless server for onboard or off-board analysis. For example, business rules for logging data during a predetermined flight may be stored within the memory 111M of the wireless network server 110, where the business rules relate to time sensitivity of the health data and a context of the health data. In one aspect, the business rules may specify that health data collected for a given flight phase is transferred to and stored by the wireless network server 110 prior to a next flight phase (e.g. data collected during flight is transferred and stored in the wireless network server prior to the landing flight phase). In other aspects, the health data collected by the wireless condition monitoring devices 130, 130A-130n may be transmitted to the wireless network server 110 at any suitable times during flight. In one aspect, each wireless condition monitoring device 130, 130A-130n is assigned a priority (as described herein) during take-off based on the business rules assigned for that flight. The priority of the wireless condition monitoring devices 130, 130A-130n may define a type of data and an amount of the data that will be collected during, for example, a predetermined flight phase (e.g. take-off, in-flight and/or landing). In one aspect, the type of data may correspond with a function of the end device 150, 150A-150n being monitored by the wireless condition monitoring devices 130, 130A-130n.

In one aspect, one or more of the wireless network server 110, the wireless access points 120, 120A-120n and the wireless condition monitoring devices 130, 130A-130n are configured for spectrum monitoring of the aircraft wireless network 125. For example, in one aspect, each of the at least one wireless condition monitoring device is configured to monitor the aircraft wireless network 125 for interference and locally store health data collected by the at least one wireless condition monitoring device 130, 130A-130n in the memory 131M of the at least one wireless condition monitoring device 130, 130A-130n when interference is present. The at least one wireless condition monitoring device 130, 130A-130n is configured to continue monitoring the aircraft wireless network 125 for interference, such as at predetermined time intervals so decrease power usage, and transmit the stored health data to the wireless network server 110 when the interference clears. Similarly, each wireless access point 120, 120A-120n may be configured to monitor the aircraft wireless network 125 for interference and locally store health data received from the respective wireless condition monitoring device(s) 130, 130A-130n in the memory 121M of the wireless access point 120, 120A-120n when interference is present. The wireless access point 120, 120A-120n may be configured to continue monitoring the aircraft wireless network 125 for interference, such as at predetermined time intervals, and transmit the stored health data to the wireless network server 110 when the interference clears. The wireless network server 110 may also be configured to monitor the aircraft wireless network 125 for interference, such as at predetermined time intervals and/or prior to/coincident with a polling message, and poll the wireless condition monitoring devices 130, 130A-130n when the cabin wireless network is substantially free from interference.

In one aspect, as described herein, the apparatus 100 supports health data monitoring that is event driven, poll driven or both event driven and poll driven. For example, data sets for the end device 150, 150A-150n being monitored are classified as event driven or polled. In one aspect, the event driven or poll driven classification of the end device 150, 150A-150n may be established by the business rules associated with each flight (the business rules may change from flight to flight) or in any other suitable manner. In one aspect, the at least one wireless condition monitoring device 130, 130A-130n is configured to locally store a list of health data in memory 131M for the respective end device 150, 150A-150n and will transmit a message including the list of health data when polled to do so by the wireless network server 110. In one aspect, polling by the wireless network server 110 may occur at any predetermined time interval such as for example, between about two (2) minutes and about fifty (50) minutes while in other aspects the polling intervals may be less than about two minutes and more than about fifty minutes. In the event that the stored list of health data exceeds a predetermined threshold (e.g. the stored data exceeds a predetermined amount of storage, is locally stored for a predetermined amount of time, etc.), the at least one wireless condition monitoring device 130,

130A-130n is configured to transmit the message including the health data without being polled by the wireless network server 110 to do so. The event driven and polled messaging described herein reduces power consumption by the at least one wireless condition monitoring device 130, 130A-130n and reduces transmissions made by the apparatus 110 over the aircraft wireless network 125 so as to reduce overall traffic on the aircraft wireless network 125.

Referring now to FIG. 5 and also to FIGS. 1-4, an exemplary operation of the apparatus 100 will be described in accordance with the present disclosure. In one aspect, the data collection process is initiated (FIG. 5, Block 400), such as before a flight of the aircraft, where business rules 401, such as those described above for event driven data, are programmed into the wireless network server 110. Transmission rate and message aggregation rules and context 402, such as those described above for poll driven data, may also be programmed into the wireless network server 110. A secure link is established between the wireless network server 110 and the wireless condition monitoring devices 130, 130A-130n (FIG. 5, Block 410) in the manner described above, where for example, MAC addresses and/or unique identifiers of the wireless condition monitoring devices 130, 130A-130n are registered (or pre-registered) with the wireless network server 110. The establishment of the secure network communication(s) provides for authentication and authorization to ensure only valid/authorized wireless condition monitoring devices 130, 130A-130n are connected to the aircraft wireless network 125. Configuration messages are sent from the wireless network server 110 to the wireless condition monitoring devices 130, 130A-130n, based on the rules 401, 402 to configure the wireless condition monitoring devices 130, 130A-130n for health data collection and management (FIG. 5, Block 420). For example, in one aspect, the configuration messages include information that assigns a priority to the end device(s) coupled to each wireless condition monitoring devices 130, 130A-130n, provides context for event and poll driven messages sent by the wireless condition monitoring devices 130, 130A-130n and/or provides data collection/transmission thresholds. In other aspects, the configuration messages may include any suitable information relating to the collection and transmission of data by the wireless condition monitoring devices 130, 130A-130n for configuring the wireless condition monitoring devices 130, 130A-130n.

In one aspect, the wireless condition monitoring devices 130, 130A-130n may each initiate a wireless network resource request to the wireless network server (FIG. 5, Block 470). In one aspect, the wireless network resource request occurs prior to flight of the aircraft and after/during configuration of the wireless condition monitoring devices 130, 130A-130n, so that network resources are reserved for each wireless condition monitoring devices 130, 130A-130n for the entire flight of the aircraft. In other aspects, the wireless network resource request may occur prior to each transmission of the wireless condition monitoring devices 130, 130A-130n, so that the network resources are allocated to the wireless condition monitoring devices 130, 130A-130n for the time it takes to make the transmission and then are released after the transmission is complete. The wireless network resource request is received by the wireless network server, such as with a resource management application running on the wireless network server, and is granted or denied (FIG. 5, Block 480). Where the wireless network resource request is denied a resource denial message is sent to the wireless condition monitoring devices 130, 130A-130n where the wireless condition monitoring devices 130, 130A-130n initiates another wireless network resource request after a predetermined time period. Where the wireless network resource request is granted, a network resource grant message is sent to the wireless condition monitoring devices 130, 130A-130n, such that the wireless condition monitoring devices 130, 130A-130n allocate network resources (FIG. 5, Block 490) for communicating over the aircraft wireless network 125. In one aspect, the network resources allocated by the wireless condition monitoring devices 130, 130A-130n include but are not limited to transmission power and transmission frequency for the purposes of control and monitoring functions.

The wireless condition monitoring devices 130, 130A-130n locally collect health data from the respective end device(s) 150, 150A-150n (FIG. 5, Block 440). As described above, the health data collected by the wireless condition monitoring devices 130, 130A-130n may be transmitted to the wireless network server 110 based on polling or events. In one aspect, the health data is received from the wireless condition monitoring devices 130, 130A-130n by the wireless network server polling the wireless condition monitoring devices 130, 130A-130n (FIG. 5, Block 430). The wireless condition monitoring devices 130, 130A-130n are also configured, as described above, for event driven health data transmission where the wireless condition monitoring devices 130, 130A-130n check to see if an event exceeds a threshold (FIG. 5, Block 450). Where the event exceeds the threshold, the wireless condition monitoring devices 130, 130A-130n transmits the health data to the wireless network server 110 (FIG. 5, Block 460). Where the event does not exceed the threshold, the wireless condition monitoring devices 130, 130A-130n continues to monitor the event until the threshold is reached, at which point the health data is transmitted to the wireless network server 110.

Examples of the present disclosure may be described in the context of aircraft manufacturing and service method 1100 as shown in FIG. 6 and aircraft 1102 as shown in FIG. 7. During pre-production, illustrative method 1100 may include specification and design (block 1104) of aircraft 1102 and material procurement (block 1106). During production, component and subassembly manufacturing (block 1108) and system integration (block 1110) of aircraft 1102 may take place. Thereafter, aircraft 1102 may go through certification and delivery (block 1112) to be placed in service (block 1114). While in service, aircraft 1102 may be scheduled for routine maintenance and service (block 1116). Routine maintenance and service may include modification, reconfiguration, refurbishment, etc. of one or more systems of aircraft 1102.

Each of the processes of illustrative method 1100 may be performed or carried out by a system integrator, a third party, and/or an operator (e.g., a customer). For the purposes of this description, a system integrator may include, without limitation, any number of aircraft manufacturers and major-system subcontractors; a third party may include, without limitation, any number of vendors, subcontractors, and suppliers; and an operator may be an airline, leasing company, military entity, service organization, and so on.

As shown in FIG. 7, aircraft 1102 produced by illustrative method 1100 may include airframe 1118 with a plurality of high-level systems 1120 and interior or cabin 1122. Examples of high-level systems 1120 include one or more of propulsion system 1124, electrical system 1126, hydraulic system 1128, and environmental system 1130. Any number of other systems may be included. Although an aerospace example is shown, the principles disclosed herein may be applied to other industries, such as the automotive industry.

Accordingly, in addition to aircraft 1102, the principles disclosed herein may apply to other vehicles that include wireless networks, e.g., land vehicles, marine vehicles, space vehicles, etc.

Apparatus(es) and method(s) shown or described herein may be employed during any one or more of the stages of the manufacturing and service method 1100. For example, components or subassemblies corresponding to component and subassembly manufacturing (block 1108) may be fabricated or manufactured in a manner similar to components or subassemblies produced while aircraft 1102 is in service (block 1114). Also, one or more examples of the apparatus(es), method(s), or combination thereof may be utilized during production stages 1108 and 1110, for example, by substantially expediting assembly of or reducing the cost of aircraft 1102. Similarly, one or more examples of the apparatus or method realizations, or a combination thereof, may be utilized, for example and without limitation, while aircraft 1102 is in service (block 1114) and/or during maintenance and service (block 1116).

A. In accordance with one or more aspects of the present disclosure, an apparatus for managing aircraft health data comprises:

a wireless network server disposed onboard an aircraft;

at least one wireless condition monitoring device disposed at least within a cabin of the aircraft, wirelessly connected to the wireless network server and configured to transmit respective health data to the wireless network server based on a communication scheme that maintains an availability of an aircraft wireless network.

A1. The apparatus of paragraph A, wherein the wireless connection between the wireless network server and the at least one wireless condition monitoring device is a secure connection.

A2. The apparatus of paragraph A1, wherein the secure connection includes registration of a MAC address or a unique identifier of the at least one wireless conditioning monitoring device with the wireless network server.

A3. The apparatus of paragraph A, wherein the communication scheme is a prioritized communication scheme that includes one or more of spatial logic and temporal logic.

A4. The apparatus of paragraph A, wherein the wireless network server is configured to poll the at least one wireless condition monitoring device at predetermined time intervals for the transmission of health data from the at least one wireless condition monitoring device.

A5. The apparatus of paragraph A, wherein the at least one wireless condition monitoring device is configured to transmit health data to the wireless network server based on an occurrence of a predetermined event.

A6. The apparatus of paragraph A, wherein the at least one wireless condition monitoring device is configured to prioritize health data prior to transmission of the health data to the wireless network server.

A7. The apparatus of paragraph A, wherein the at least one wireless condition monitoring device is configured to:

monitor the aircraft wireless network for interference and locally store health data collected by the at least one wireless condition monitoring device when interference is present; and transmit the stored health data to the wireless network server when the interference clears.

A8. The apparatus of paragraph A, wherein the at least one wireless condition monitoring device is configured to record predetermined health data based on rules assigned to a corresponding flight for the aircraft where the predetermined health data is transmitted to and stored by the wireless server for onboard or off-board analysis.

A9. The apparatus of paragraph A, wherein the at least one wireless condition monitoring device includes or is connected to one or more of:

an aircraft seating monitoring device for monitoring actuation of one or more respective seats;

an aircraft lavatory equipment monitoring device for monitoring operation of lavatory equipment;

an aircraft cabin video and audio monitoring device for monitoring operation of one or more aircraft passenger entertainment devices;

an aircraft service galley equipment monitoring device for monitoring one or more devices of a respective service galley;

an aircraft flight deck equipment monitoring device for monitoring one or more devices of an aircraft flight deck;

an aircraft control surface monitoring device for monitoring control surface actuators or movement of aircraft control surfaces; and an aircraft landing gear monitoring device for monitoring actuation or movement of aircraft landing gear.

A10. The apparatus of paragraph A, wherein the at least one wireless condition monitoring device is configured to:

send a resource request to the wireless network server; and allocate wireless network resources of the at least one wireless condition monitoring device depending on a receipt of a resource grant by the at least one wireless condition monitoring device from the wireless network server.

A11. The apparatus of paragraph A10, wherein the wireless network resources include at least power and frequency requirements.

A12. The apparatus of paragraph A, further comprising a wireless access point that wirelessly connects the at least one wireless condition monitoring device to the wireless network server.

A13. The apparatus of paragraph A, further comprising more than one equipment group, each equipment group having at least one respective wireless condition monitoring device where the at least one respective wireless condition monitoring device of each equipment group is wirelessly connected to the wireless network receiver.

A14. The apparatus of paragraph A13, wherein each equipment group includes a respective wireless access point, the respective wireless access point wirelessly connecting the at least one respective wireless condition monitoring device to the wireless network server.

A15. The apparatus of paragraph A, wherein the at least one wireless condition monitoring device includes a master wireless condition monitoring device in communication with another wireless condition monitoring device of the at least one wireless condition monitoring device, the master wireless condition monitoring device being configured to communicate health data received from the other wireless condition monitoring device to the wireless network server.

A16. The apparatus of paragraph A, wherein at least one of the at least one wireless condition monitoring devices is disposed within a cabin of the aircraft.

A17. The apparatus of paragraph A, wherein the aircraft wireless network is an aircraft cabin wireless network.

B. In accordance with one or more aspects of the present disclosure, a method for managing aircraft health data comprises:

configuring communication between a wireless network server disposed onboard an aircraft and at least one wireless condition monitoring device disposed onboard the aircraft; and wirelessly transmitting respective health data from the at least one wireless condition monitoring device to the wireless network server based on a communication scheme that maintains an availability of an aircraft wireless network.

B1. The method of paragraph B, wherein configuring communication between the wireless network server and the at least one wireless condition monitoring device includes establishing a secure connection.

B2. The method of paragraph B1, wherein the establishing the secure connection includes registering a MAC address or a unique identifier of the at least one wireless conditioning monitoring device with the wireless network server.

B3. The method of paragraph B, wherein the communication scheme is a prioritized communication scheme that includes one or more of spatial logic and temporal logic.

B4. The method of paragraph B, further comprising polling the at least one wireless condition monitoring device, with the wireless network server, at predetermined time intervals and transmitting health data from the at least one wireless condition monitoring device to the wireless network server in response to the polling.

B5. The method of paragraph B, further comprising transmitting to the wireless network server, from the at least one wireless condition monitoring device, health data based on an occurrence of a predetermined event.

B6. The method of paragraph B, further comprising prioritizing health with the at least one wireless condition monitoring device prior to transmission of the health data to the wireless network server.

B7. The method of paragraph B, further comprising:

monitoring the aircraft wireless network, with the at least one wireless condition monitoring device, for interference and locally storing health data collected by the at least one wireless condition monitoring device when interference is present; and transmitting the stored health data to the wireless network server, from the at least one wireless condition monitoring device, when the interference clears.

B8. The method of paragraph B, further comprising recording predetermined health data, with the at least one wireless condition monitoring device, based on rules assigned to a corresponding flight for the aircraft where the predetermined health data is transmitted to and stored by the wireless server for onboard or off-board analysis.

B9. The method of paragraph B, wherein configuring communication between the wireless network server and the at least one wireless condition monitoring device includes:

sending a resource request from the at least one wireless condition monitoring device to the wireless network server; and allocating wireless network resources with the at least one wireless condition monitoring device depending on a receipt of a resource grant by the at least one wireless condition monitoring device from the wireless network server.

B10. The method of paragraph B9, wherein the wireless network resources include at least power and frequency requirements.

B11. The method of paragraph B, wherein at least one of the at least one wireless condition monitoring devices is disposed within a cabin of the aircraft.

B12. The apparatus of paragraph B, wherein the aircraft wireless network is an aircraft cabin wireless network.

C. In accordance with one or more aspects of the present disclosure, an aircraft comprises:

a cabin;

at least one end device disposed onboard the aircraft; and an aircraft health data monitoring system that includes:

a wireless network server disposed onboard the aircraft; and at least one wireless condition monitoring device associated with a respective one of the at least one end device and disposed onboard the aircraft, the at least one wireless condition monitoring device being wirelessly connected to the wireless network server and configured to transmit respective health data, corresponding to respective one of the at least one end device, to the network server based on a communication scheme that maintains an availability of an aircraft wireless network.

C1. The aircraft of paragraph C, wherein the wireless connection between the wireless network server and the at least one wireless condition monitoring device is a secure connection.

C2. The aircraft of paragraph C1, wherein the secure connection includes registration of a MAC address or a unique identifier of the at least one wireless conditioning monitoring device with the wireless network server.

C3. The aircraft of paragraph C, wherein the communication scheme is a prioritized communication scheme that includes one or more of spatial logic and temporal logic.

C4. The aircraft of paragraph C, wherein the wireless network server is configured to poll the at least one wireless condition monitoring device at predetermined time intervals for the transmission of health data from the at least one wireless condition monitoring device.

C5. The aircraft of paragraph C, wherein the at least one wireless condition monitoring device is configured to transmit health data to the wireless network server based on an occurrence of a predetermined event.

C6. The aircraft of paragraph C, wherein the at least one wireless condition monitoring device is configured to prioritize health data prior to transmission of the health data to the wireless network server.

C7. The aircraft of paragraph C, wherein the at least one wireless condition monitoring device is configured to:

monitor the aircraft wireless network for interference and locally store health data collected by the at least one wireless condition monitoring device when interference is present; and transmit the stored health data to the wireless network server when the interference clears.

C8. The aircraft of paragraph C, wherein the at least one wireless condition monitoring device is configured to record predetermined health data based on rules assigned to a corresponding flight for the aircraft where the predetermined health data is transmitted to and stored by the wireless server for onboard or off-board analysis.

C9. The aircraft of paragraph C, wherein the at least one wireless condition monitoring device includes or is connected to one or more of:

an aircraft seating monitoring device for monitoring actuation of one or more respective seats;

an aircraft lavatory equipment monitoring device for monitoring operation of lavatory equipment;

an aircraft cabin video and audio monitoring device for monitoring operation of one or more aircraft passenger entertainment devices;

an aircraft service galley equipment monitoring device for monitoring one or more devices of a respective service galley;

an aircraft flight deck equipment monitoring device for monitoring one or more devices of an aircraft flight deck;

an aircraft control surface monitoring device for monitoring control surface actuators or movement of aircraft control surfaces; and an aircraft landing gear monitoring device for monitoring actuation or movement of aircraft landing gear.

C10. The aircraft of paragraph C, wherein the at least one wireless condition monitoring device is configured to:

send a resource request to the wireless network server; and allocate wireless network resources of the at least one wireless condition monitoring device depending on a receipt of a resource grant by the at least one wireless condition monitoring device from the wireless network server.

C11. The aircraft of paragraph C10, wherein the wireless network resources include at least power and frequency requirements.

C12. The aircraft of paragraph C, further comprising a wireless access point that wirelessly connects the at least one wireless condition monitoring device to the wireless network server.

C13. The aircraft of paragraph C, further comprising more than one equipment group, each equipment group having at least one respective wireless condition monitoring device where the at least one respective wireless condition monitoring device of each equipment group is wirelessly connected to the wireless network receiver.

C14. The aircraft of paragraph C13, wherein each equipment group includes a respective wireless access point, the respective wireless access point wirelessly connecting the at least one respective wireless condition monitoring device to the wireless network server.

C15. The aircraft of paragraph C, wherein the at least one wireless condition monitoring device includes a master wireless condition monitoring device in communication with another wireless condition monitoring device of the at least one wireless condition monitoring device, the master wireless condition monitoring device being configured to communicate health data received from the other wireless condition monitoring device to the wireless network server.

C16. The aircraft of paragraph C, wherein at least one of the at least one wireless condition monitoring devices and at least one of the at least one device is disposed within a cabin of the aircraft.

C17. The aircraft of paragraph C, wherein the aircraft wireless network is an aircraft cabin wireless network.

Different examples of the apparatus(es) and method(s) disclosed herein include a variety of components, features, and functionalities. It should be understood that the various examples of the apparatus(es) and method(s) disclosed herein may include any of the components, features, and functionalities of any of the other examples of the apparatus(es) and method(s) disclosed herein in any combination, and all of such possibilities are intended to be within the scope of the present disclosure.

Many modifications of examples set forth herein will come to mind to one skilled in the art to which the present disclosure pertains having the benefit of the teachings presented in the foregoing descriptions and the associated drawings.

Therefore, it is to be understood that the present disclosure is not to be limited to the specific examples illustrated and that modifications and other examples are intended to be included within the scope of the appended claims. Moreover, although the foregoing description and the associated drawings describe examples of the present disclosure in the context of certain illustrative combinations of elements and/or functions, it should be appreciated that different combinations of elements and/or functions may be provided by alternative implementations without departing from the scope of the appended claims. Accordingly, parenthetical reference numerals in the appended claims are presented for illustrative purposes only and are not intended to limit the scope of the claimed subject matter to the specific examples provided in the present disclosure.

What is claimed is:

1. An apparatus for managing aircraft health data comprising:

a wireless network server disposed onboard an aircraft;

at least one wireless condition monitoring device disposed onboard the aircraft, wirelessly connected to the wireless network server and configured to transmit respective health data to the wireless network server based on an event prioritization communication scheme that maintains an availability of an aircraft wireless network based on event precedence.

2. The apparatus of claim 1, wherein the event prioritization communication scheme is a prioritized communication scheme that includes one or more of spatial logic and temporal logic.

3. The apparatus of claim 1, wherein the wireless network server is configured to poll the at least one wireless condition monitoring device at predetermined time intervals for the transmission of health data from the at least one wireless condition monitoring device.

4. The apparatus of claim 1, wherein the at least one wireless condition monitoring device is configured to transmit health data to the wireless network server based on an occurrence of a predetermined event.

5. The apparatus of claim 1, wherein the at least one wireless condition monitoring device is configured to prioritize health data prior to transmission of the health data to the wireless network server.

6. The apparatus of claim 1, wherein the at least one wireless condition monitoring device is configured to:

monitor the aircraft wireless network for interference and locally store health data collected by the at least one wireless condition monitoring device when interference is present; and transmit the stored health data to the wireless network server when the interference clears.

7. The apparatus of claim 1, wherein the at least one wireless condition monitoring device is configured to:

send a resource request to the wireless network server; and allocate wireless network resources of the at least one wireless condition monitoring device depending on a receipt of a resource grant by the at least one wireless condition monitoring device from the wireless network server.

8. The apparatus of claim 1, wherein the at least one wireless condition monitoring device includes or is connected to one or more of:

an aircraft seating monitoring device for monitoring actuation of one or more respective seats;

an aircraft lavatory equipment monitoring device for monitoring operation of lavatory equipment;

an aircraft cabin video and audio monitoring device for monitoring operation of one or more aircraft passenger entertainment devices;

an aircraft service galley equipment monitoring device for monitoring one or more devices of a respective service galley;

an aircraft flight deck equipment monitoring device for monitoring one or more devices of an aircraft flight deck;

an aircraft control surface monitoring device for monitoring control surface actuators or movement of aircraft control surfaces; and an aircraft landing gear monitoring device for monitoring actuation or movement of aircraft landing gear.

9. The apparatus of claim 1, further comprising more than one equipment group, each equipment group having at least one respective wireless condition monitoring device where the at least one respective wireless condition monitoring device of each equipment group is wirelessly connected to the wireless network receiver.

10. The apparatus of claim 1, wherein the at least one wireless condition monitoring device includes a master wireless condition monitoring device in communication with another wireless condition monitoring device of the at least one wireless condition monitoring device, the master wireless condition monitoring device being configured to communicate health data received from the other wireless condition monitoring device to the wireless network server.

11. The apparatus of claim 1, wherein at least one of the at least one wireless condition monitoring devices is disposed within a cabin of the aircraft.

12. A method for managing aircraft health data comprising:

configuring communication between a wireless network server disposed onboard an aircraft and at least one wireless condition monitoring device disposed onboard the aircraft; and wirelessly transmitting respective health data from the at least one wireless condition monitoring device to the wireless network server based on an event prioritization communication scheme that maintains an availability of an aircraft wireless network based on event precedence.

13. The method of claim 12, wherein configuring communication between the wireless network server and the at least one wireless condition monitoring device includes establishing a secure connection.

14. The method of claim 12, wherein the event prioritization communication scheme is a prioritized communication scheme that includes one or more of spatial logic and temporal logic.

15. The method of claim 12, further comprising polling the at least one wireless condition monitoring device, with the wireless network server, at predetermined time intervals and transmitting health data from the at least one wireless condition monitoring device to the wireless network server in response to the polling.

16. The method of claim 12, further comprising transmitting to the wireless network server, from the at least one wireless condition monitoring device, health data based on an occurrence of a predetermined event.

17. The method of claim 12, further comprising:

monitoring the aircraft wireless network, with the at least one wireless condition monitoring device, for interference and locally storing health data collected by the at least one wireless condition monitoring device when interference is present; and transmitting the stored health data to the wireless network server, from the at least one wireless condition monitoring device, when the interference clears.

18. The method of claim 12, wherein configuring communication between the wireless network server and the at least one wireless condition monitoring device includes:

sending a resource request from the at least one wireless condition monitoring device to the wireless network server; and allocating wireless network resources with the at least one wireless condition monitoring device depending on a receipt of a resource grant by the at least one wireless condition monitoring device from the wireless network server.

19. An aircraft comprising:

a cabin;

at least one end device disposed onboard the aircraft; and an aircraft health data monitoring system that includes:

a wireless network server disposed onboard the aircraft; and at least one wireless condition monitoring device associated with a respective one of the at least one end device and disposed onboard the aircraft, the at least one wireless condition monitoring device being wirelessly connected to the wireless network server and configured to transmit respective health data, corresponding to respective one of the at least one end device, to the network server based on an event prioritization communication scheme that maintains an availability of an aircraft wireless network based on event precedence.

20. The aircraft of claim 19, wherein the event prioritization communication scheme is a prioritized communication scheme that includes one or more of spatial logic and temporal logic.

* * * * *